June 23, 1970 — TADEUSZ KOWALSKI — 3,516,376
STRUCTURE FOR REDUCING THE DRAG BETWEEN A FLUID AND A SOLID BODY
Filed Aug. 16, 1968 — 4 Sheets-Sheet 1

INVENTOR
TADEUSZ KOWALSKI
BY
ATTORNEY

June 23, 1970     TADEUSZ KOWALSKI     3,516,376
STRUCTURE FOR REDUCING THE DRAG BETWEEN A FLUID AND A SOLID BODY
Filed Aug. 16, 1968     4 Sheets-Sheet 2

INVENTOR

TADEUSZ KOWALSKI

BY

ATTORNEY

INVENTOR
TADEUSZ KOWALSKI

ATTORNEY

United States Patent Office 3,516,376
Patented June 23, 1970

3,516,376
STRUCTURE FOR REDUCING THE DRAG
BETWEEN A FLUID AND A SOLID BODY
Tadeusz Kowalski, 451 Parkwood Court,
Waterloo, Ontario, Canada
Filed Aug. 16, 1968, Ser. No. 753,208
Int. Cl. B63b 1/34
U.S. Cl. 114—67                           13 Claims

ABSTRACT OF THE DISCLOSURE

This invention is directed to a structure and process for reducing the drag between a fluid and a body where there is relative flow between the fluid and the body. A dilute solution of a high molecular weight polymer is periodically injected into a fluid flow through a container or into a fluid through which a device moves. The polymer is injected through a plurality of nozzles at a small angle relative to the surface such that the ejection of the polymer through a nozzle is substantially tangential with the surface.

---

This invention relates to a process and a structure for reducing the drag between a fluid and a solid body where there is relative movement between the fluid and the solid body. It relates both to external flow, namely, the movement of ships, submarines, torpedoes, etc. through water and to internal flows of the once-through type, namely the flow of water through firefighting hoses, irrigation piping, etc.

It is well known that a major portion of the drag of a water-borne vehicle of either the submerged-type or the surface-type is the frictional drag of the water in its relative flow past the vehicle. A substantial reduction in such drag would provide a very noticeable increase in the efficiency which can be used to advantage in different ways. Thus, the speed can be increased with the same power expenditure, or the power can be reduced for the same speed which, in turn, provides better economy and reduces the weight of the power plant. In addition, reduction of the drag of a liquid moving through a tube, such as a firefighting hose or an irrigation piping, would result in a substantial saving in the power required to pump the water through such tubing.

Various proposals have been made in an effort to reduce the frictional drag and these have met with varying degrees of success. One of the oldest and most obvious is polishing the wetted surface or applying coatings of smooth finish materials.

Another proposal is the ejection of air through the hull of the craft near the nose or through a perforated pipe extending from the craft to reduce water density and presumably, its viscosity in the boundary layer. A modification of this is the ejection of a mixture of water and air plus a soap or detergent of some kind to maintain the air bubbles. These latter proposals are helpful but they require a considerable amount of machinery aboard the craft and conduits to transport the mixture from the pumps to the surrounding water. In submerged vehicles, these conduits obviously must pass through walls, which is an additional drawback. In addition, although the concentration of the soap or detergent is not great, the ejection must be carried on for a considerable length of time, and so a considerable amount of such soap or detergent is required to be stored aboard the vessel in order to provide sufficient drag reducing characteristics.

The mechanical arrangements outlined above are advantageous when it is necessary or desirable to maintain the drag reduction for long periods of time. The advantage is, however, substantially reduced by the fact that the power used to operate them could otherwise be used to increase the driving power for the vehicle. In any event, their complication and their excessive power requirements rule them out as solutions for the problem of maintaining optimum drag reduction for even limited periods of time. One example of such requirement is the operation of a torpedo. The time lapse from firing until it reaches the target is only a few minutes but the target is usually moving and increased speed of the torpedo could result in greater accuracy in firing. Furthermore, there is no substantial space available within the torpedo to store a large supply of drag reducing material or to accommodate the additional equipment to pump it into the flow stream; any means external to the torpedo must be small and must produce substantially no drag increase itself. A means which will operate for ten to twenty minutes would serve the purpose adequately.

Military submarines also have a requirement for short term high drag reduction when they are attacked and pursued by enemy craft. Drag reduction is equivalent to power increase as far as speed is concerned and a difference in maximum speed of a few knots for as little as one hour may spell the difference between escape and destruction.

Still another field of use for a short term drag reducer is in the operation of hydrofoil craft. In order to become airborne or to "ride up" on the hydrofoils, the craft must overcome the "drag hump," or the force required for the hull to break away from the surface. This usually requires more power than does the sustained high speed cruise condition, and represents one of the most critical aspects of the hydrofoil propulsion problem as the propulsive device is operating at a poor efficiency at this time. A successful drag reducer can, therefore, provide very significant improvements in the overall hydrofoil craft performance by allowing the use of lower powered prime movers. The reduced power requirement and consequent reduced weight could allow a larger payload to be carried.

Still another solution to this problem is based on the fact that the friction co-efficient in turbulent flow can be reduced by adding foreign materials to the fluid. These foreign materials are the so-called non-Newtonian additives. Although the concentrations of such additives are minute, the continuous normal injection requires huge amounts of additives for full size ships. One means which used this principle is suggested in United States Pat. No. 3,196,823 issued July 27, 1965, to Sidney Thurston. In that patent, it is suggested that the drag reducing material be solidified into a matrix of the desired shape and be mounted exteriorly of the vehicle at or near the fore end. The patentee implies that when the vehicle travels forwardly through the water, the relative flow over the solidified mass of the drag reducing agent would cause it gradually to dissolve or to mix in the water which would then form the boundary layer of the vehicle in passing. Even though the patentee suggests the provision of the 0.01 percent of additive throughout the water volume through which the craft is moving, it is clear that this is an impractical situation. Taking as an example a landing craft of dimensions 60 feet by 20 feet by 5 foot draft, of immersed cross-section of 20 feet by 5 feet travelling at a speed of 10 knots, the water volume swept by the craft per minute would be 101,400 cubic feet. For a 30-minute run, the required additive would be approximately 18,960 pounds. The volume of such additive assuming a specific gravity of 1 would be 304 cubic feet. Assuming this to be in the form of a cylinder of the same length as the beam of the craft, this would involve a cylinder of a diameter of 4.4 feet. It is clear, therefore, that the solution suggested by the patentee would not be practical for a landing craft.

Similarly, taking the example of a submarine of 300 foot length by 30 foot diameter traveling at 35 knots, the average volume of water in the boundary layer would be $17 \times 10^6$ cubic feet per hour. The amount of additive required for a 0.01 percent solution per hour would be approximately 106,000 pounds. It is clear that these amounts are prohibitive for use in any practical manner.

An object of the present invention is the provision of a procedure whereby the drag between a fluid and a solid body, in which there is relative movement between the fluid and the solid body, is reduced in a practical manner.

Still another object is the provision of a practical means for reducing the drag between a fluid and a solid body where there is relative movement between the fluid and the solid body.

Yet another object is the provision of a process for reducing the drag between a water-borne vehicle and the water through which the vehicle travels.

Another object is the provision of a process for reducing the drag between a liquid and the conduit which carries such liquid.

Still another object is the provision of an improved water-borne vehicle provided with means for reducing the drag between the vehicle and the water, the water-borne vessel being a ship, a submarine, a torpedo, a motor boat, a pleasure craft, a sail boat or a competitive water craft.

According to a broad aspect of the present invention, a process is provided for reducing the drag between a liquid and a solid body where there is relative movement between the liquid and the solid body, the process comprising: periodically injecting a dilute solution of a high molecular weight polymer nearly tangentially into the boundary layer between the fluid and the solid body.

By one preferred embodiment of this aspect of the invention, the process is applicable for reducing the drag of a water-borne craft moving through water. By another embodiment of this aspect of the present invention, the process is applicable to reduce the drag of water flowing through a conduit.

By an aspect of either of these embodiments of this invention, the periodic injection is for a time $(t)$ seconds of injection followed by $(n)(t)$ seconds of pause, particularly where the period of "injection" time is 1–5 seconds followed by a period of "pause" time of 5–20 seconds.

By another aspect of the present invention, a structure is provided for reducing the drag between a fluid and a solid body, where there is relative movement between the fluid and the solid body, the structure comprising: a solid having a first surface and a second surface, a plurality of longitudinally spaced apart rows of channels extending along the first surface, each of the rows of channels including a plurality of channel segments, each channel segment extending from the first surface to the second surface, at an angle between about 1° and 8° to the plane of the first surface, inlet means from the second surface to each of the slots, and means connected to the inlet means for periodically injecting a liquid into each of the slots, for subsequent periodic ejection from each of the slots.

In one embodiment of this aspect of the invention, the structure comprises a conduit, the plurality of slots are longitudinally spaced apart and are circumferentially disposed on the inside of the conduit, means are provided on the outside of the conduit constituting an inlet to each of the slots, and means are provided for the periodic ejection of a liquid from the exterior of the conduit to the interior of the conduit through each of the slots, the ejected liquid travelling in the same direction as the liquid within the conduit.

By another embodiment of this aspect of the present invention, the structure comprises a water-borne vessel, the plurality of longitudinally spaced apart rows of slots are disposed on the outer hull of the vessel, means are provided within the vessel constituting an inlet to each of the slots, and means are provided for periodically injecting a liquid into each of the slots for subsequent periodic ejection from each of the slots, the slots facing aft of the vessel.

By a particular embodiment of this aspect of the invention, the water-borne vehicle is a torpedo or submarine, the plurality of longitudinally spaced apart rows of slots are disposed in a plurality of rings encircling the torpedo or submarine, and the circumferential slot is subdivided into from twelve to twenty-four segments, each independently fed from a constant pressure container containing the liquid to be periodically injected into each of the slots, for subsequent periodic ejection from the slots.

By still another preferred embodiment of this aspect of this invention, the water-borne vehicle is a ship. In the case of the ship, the plurality of longitudinally spaced apart rows of slots is disposed on the outer hull of the ship, below the water line. In either case, twelve or less circumferential subdivisions are provided in the slot, and a pumping means is provided within the ship for periodically injecting the liquid into each of the slots for subsequent ejection from each of the slots.

Thus, it is seen that the principal prerequisites of the procedure and structure of the present invention involve injection pulsing combined with nearly tangential ejection. The details of the construction of suitable nozzles for such dual purpose depend upon the particular application. Thus, the precise nozzle design and construction depends on the shape and size of the surface where the high molecular weight polymer is to be injected. The main prerequisites of the nozzle are, firstly, nearly tangential ejection of polymer. It has been found that the angle of inclination should be the smallest possible with regard to the construction and strength of the slot. It has been found that an angle of from 1° to 8° to the plane of the surface, the opening facing aft or in the direction of flow of the fluid, is suitable.

The second critical feature is even distribution of the polymer per unit area of surface. This, too, depends upon the particular size and shape of the surface. Taking the immersed part of the hull of a surface ship, for example, the injection slots must have the thickness, or the pressure of ejection, or both, varying with the distance below the water surface and the curvature of the hull. The longitudinal spacing of the injection slots in the plurality of rows of injection slots also depends upon the particular application. One particular spacing between the rows of injection slots which has been found to be suitable under laboratory test condition is approximately three feet.

With respect to injection pulsing, this consists of a time of $t$ seconds of injection followed by a time of $(n)$ $(t)$ seconds pause. The factor $n$ depends on a number of parameters, namely the relative speed of movement of the body, and the fluid, the type of polymer, the concentration of polymer being ejected, the rate of ejection of polymer, the type of body and the design of the ejection slots. For experiments in which the speed of the body was 1.2 feet per second, the polymer was Polyox WSR 301 of molecular weight $4 \times 10^6$, the concentration being 0.5 percent by weight, the rate of injection being 6 ml. per second, the type of body being a flat plate and the injection slots being disposed 5° to the plane of the surface, the time $t$ was 1 second and the factor $n$ was 10.

The high molecular weight polymer which is used is any polymer which can impart non-Newtonian characteristics to water. In other words, the polymer which is used is any material which will reduce the friction coefficient of the water. Examples of suitable such polymers are the polymers known by the trade name "Polyox" and manufactured by Union Carbide. Some suitable such Polyox polymers include Polyox WSR 301 (polyethylene oxide of molecular weight $4 \times 10^6$); Polyox FRA (polyethylene oxide of molecular weight $7 \times 10^6$); and Polyox WSR 35 (polyethylene oxide of molecular weight $1 \times 10^6$). Other materials include that known by the trademark of "Jaguar Gum" and manufactured by Stein and Hall. This material is a $\beta$-1,4 - glycosidic mannose with branched $\alpha$-glycosidic linkages, and has a molecular weight of $7 \times 10^5$. Another material which may be used is Dowfax 9N–40 (ethylene oxide adduct on p-nonylphenol with 40 ethylene oxide units).

The concentration of the high molecular weight polymer in water is selected so that a solution is provided which, when injected in water, will give the required drag reduction. For a polymer such as Polyox, the required concentration in water is from 1–200 parts per million by weight, whereas for Jaguar, the required concentration is 20–1000 parts per million by weight. This may be achieved by the use of an aqueous solution of the polymer of from 0.1 to 2 percent by weight, preferably 0.5 percent by weight. The rate of injection will be dependent upon the relative movement between the solid body and the water.

Figure 1:
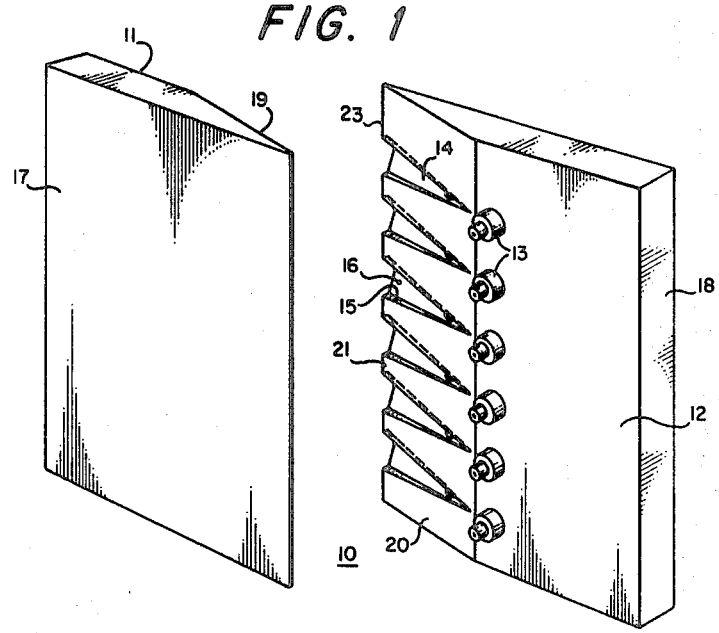
FIG. 1 is an exploded perspective view of a structure of a portion of one aspect of the present invention.
Figure 2:
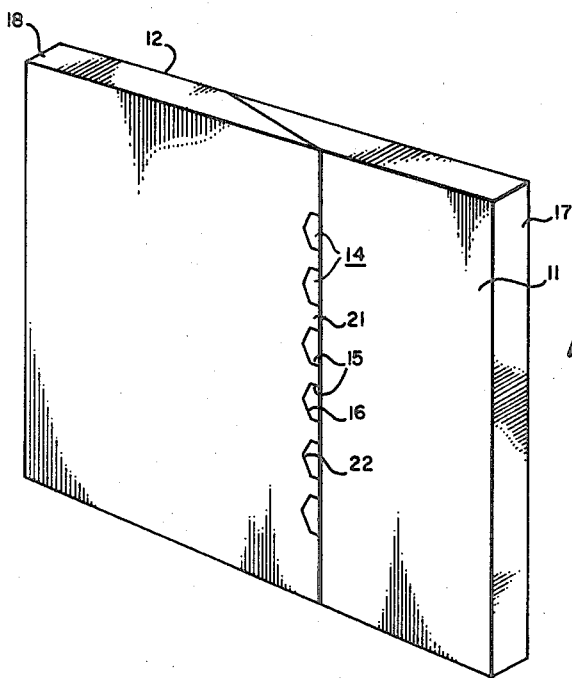
FIG. 2 is a perspective view of a structure according to one embodiment of the invention.
Figure 3:
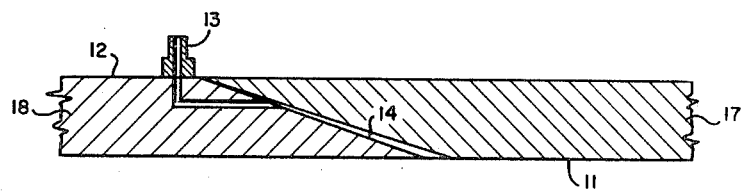
FIG. 3 is a section along the line III—III of FIGS. 2 and 4.
Figure 4:
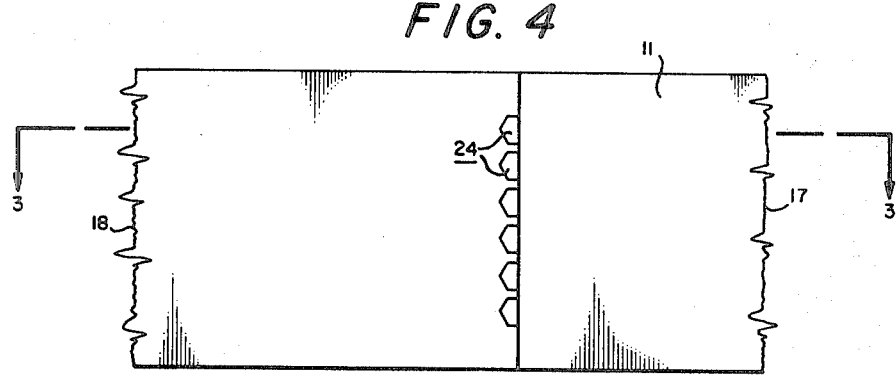
FIG. 4 is a front elevation of the embodiment shown in FIGS. 2 and 3.
Figure 5:
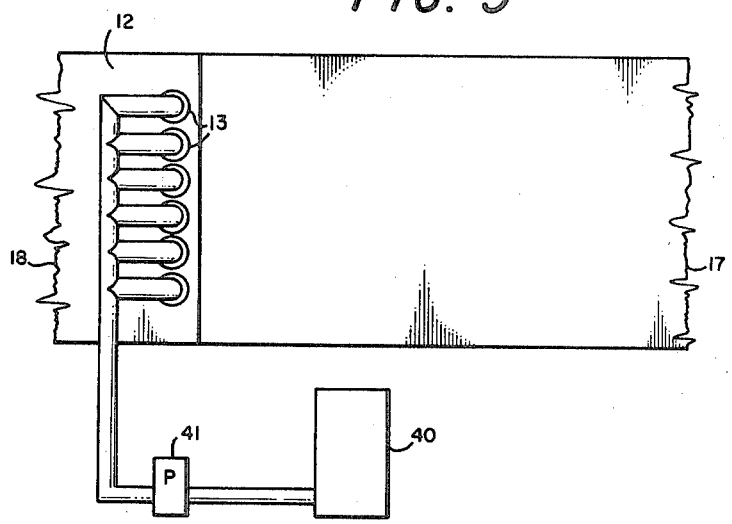
FIG. 5 is a rear elevation of the embodiment shown in FIGS. 2 and 3.

Turning firstly to FIGS. 1 to 5, it is seen that the structure 10 of one embodiment of the present invention is provided in two sections, namely plate 17 and plate 18. Plate 17 and plate 18 are adapted to be joined together by mating of angular portions 19 and 20 respectively, disposed at an angle of about 5° to the side faces 11 and 12 respectively of plates 17 and 18. Plate 18 is provided with a plurality of channel-like slots 14, in this case six, which, as shown in FIGS. 2, 3 and 4, extend to edge 23 to provide a plurality of vertically spaced apart nozzles 24 which are adapted to provide nearly tangential ejection of liquid material from face 12 through to face 11 of the structure 10. As will be more clearly seen in FIG. 1, each channel-like slot 14 is provided with an inlet tube 13. Furthermore, as will be more clearly seen in FIG. 1, each channel-like slot 14 is defined by laterally diverging side edges 15, providing downwardly sloping side walls 16 which meet at a central vertex 22. Thus, the general appearance of the plurality of nozzles 24, as shown in FIG. 2, is an alternate series of peaks 21 at the apex of side walls 16 and valleys at the central vertex 22.

Inlet tube 13 is connected to any suitable source of liquid under sufficient pressure to permit the periodic ejection of liquid through the nozzles 24 provided by the plurality of channel-like slots 14. For illustrative purposes a tank 40 for storing the high molecular weight polymer and a suitable pump 41 is shown for injection of the polymer.

Figure 6:
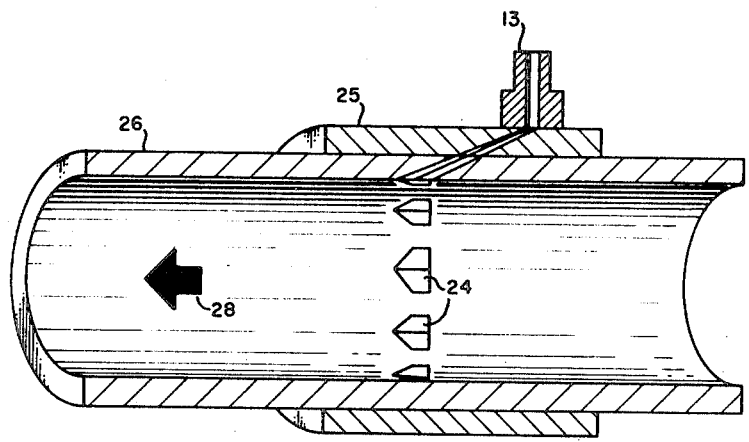
FIG. 6 is a perspective view of another embodiment of this invention wherein the invention is applied in conjunction with a conduit.

Several different embodiments of this invention are shown in FIGS. 6 to 9 inclusive. In FIG. 6, the invention is shown in the form of a novel conduit, i.e. the combination with a conduit, more particularly a hose for firefighting, or for irrigation tubing. The structure which includes the nozzles therein is disposed as an encircling manifold 25 around the tube 26. Disposed on and encircling the outer surface of the manifold 25 are the plurality of inlet tubes 13, each suitably connected to its respective slot-like channel 14 providing an inwardly directed nozzle 24. A plurality of rings of such plurality of inlet tubes 13—slot-like channel 14—nozzle 24 units are provided spaced apart by a longitudinal distance indicated generally as 27. This particular longitudinal spacing depends on the particular parameters of the hose 26. However, a spacing of about 3 feet should be satisfactory.

It is noted that the nozzles 24 are adapted so that the dilute aqueous solution of high molecular weight polymer is ejected in the same direction as the liquid flow, designated by arrow 28.

Figure 7:
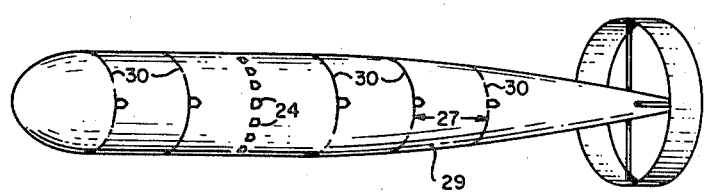
FIG. 7 is a perspective view of another embodiment of this invention wherein the invention is applied in conjunction with a torpedo.

FIG. 7 shows the invention in the form of a novel torpedo, i.e. the combination with a torpedo 29. The invention is provided by a plurality of longitudinally spaced apart rings 30 encircling the torpedo 29, each ring comprising a plurality of slot-like channels 14 terminating in outer nozzles 24. Since the size of the torpedo is relatively small, the space there inside does not permit the installation of a large reservoir of the aqueous solution of the high molecular weight polymer. Consequently, the circumferential rings 30 are each provided with between 12 to 24 segments (i.e. separate slot-like channels 14 terminating in nozzles 24), each independently periodically fed from a common constant pressure container (disposed within the torpedo but not shown) provided with conventional timing devices to control the periodic injection.

Figure 8:
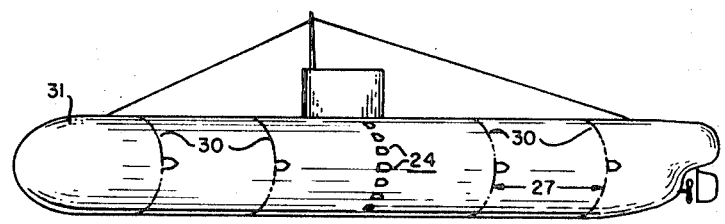
FIG. 8 is an elevational view of another embodiment of the present invention applied in conjunction with a submarine.

The embodiment shown in FIG. 8 depicts the invention as a novel submarine, i.e. the combination with a submarine. In essence, the invention is similar to that shown in FIG. 7; the submarine 31 is provided with a plurality of longitudinally spaced apart rings 30 engirdling the submarine, each ring 30 being similarly constructed as that of ring 30 of FIG. 7. Since the availability of space behind the injection slot-like channels 14 is not so critical, there may be as little as 6–12 circumferential subsivisions (i.e. 6–12 separate slot-like channels 14 terminating in nozzles 24). A pumping mechanism (not shown) is also provided within the submarine 31.

Figure 9:
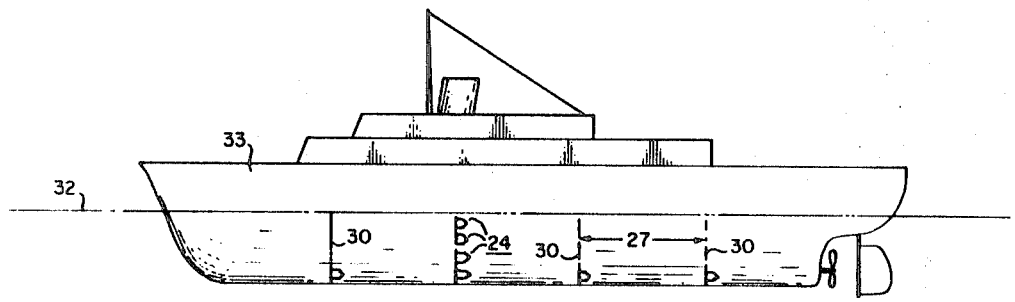
FIG. 9 is an elevational view of a further embodiment of this invention applied in conjunction with a ship.

The embodiment shown in FIG. 9 depicts the invention as a novel surface ship, i.e. the combination with a surface ship. In this case, a plurality of longitudinally spaced apart partial rings 30 are provided only below the waterline 32 of the ship 33. The structure of each of the partial rings 30 of FIG. 9 is the same as that for FIGS. 7 and 8 previously described. It is to be noted in the embodiment of FIG. 9, as well as in the embodiments of FIGS. 7 and 8, that the slot-like channels 14 and the nozzles 24 are arranged so that they eject the aqueous solution of high molecular polymer rearwardly (aft) of the vessel.

The longitudinal spacing 27 between the rings 30 providing the plurality of nozzles 24 in the torpedo in FIG. 7, the submarine in FIG. 8 and the ship in FIG. 9 depends upon a number of factors. In practice, these will be determined from experience. However, it is believed that a spacing of from 5–50 feet will be satisfactory.

Tests have been carried out using models to demonstrate the surprising utility of the procedure of an aspect of the present invention. The experimental work was conducted in a 40-foot flume having a maximum flow of 6 cubic feet per second. A hot film probe DISA 55A83 and a constant temperature anemometer and recording equipment were used as well as a Schaevitz displacement transducer and Sanborn differential pressure transducer ±20 inches of water, together with amplifying and recording systems. In addition, a recirculating open channel was used which had five injection slots of different angle of inclination to the flow in the first half of its length and 10 static holes through its length. The hydraulic gradient line was measured by means of a bank of manometer tubes and the turbulence characteristics were measured by means of the hot film probe. A pitot tube coupled to a differential pressure transducer was used to calibrate the hot film probe and to explore the velocity profiles. Visual and photographic means were used for the determination of polymer dispersion and the effectiveness of the injection of polymer was judged by changes in turbulence, slope of the hydraulic line and velocity profiles. Turbulence characteristics were measured by the hot film probe and were recorded on a chart recorder, as well as on magnetic tape.

The tests were performed at 1.2 feet per second mean velocity of the water through the test section, corresponding to local Reynolds number $1.6 \times 10^5$ based on the 2-foot distance of the hot film probe from the sand strip used to trip the boundary layer.

Injection tests using different slots showed that 5° slot which injected the polymer almost tangentially to the direction of water flow provided the optimum results. This was judged visually by observing the dispersion of dyed polymer into the main flow.

It is believed that the longer the polymer stays in the boundary layer, the better effect it has on drag reduction. A comparison was also made between injection of pure water and a 0.5 percent polymer solution through a 90° slot and through a 25° slot. It was found that the polymer did not diffuse into the main flow of the water as rapidly as did the ejected water. It is believed that the polymer may be exhibiting a so-called "surface effect," i.e. it may seek a boundary in the flow and may attach itself to it. Confirmation of the surface effect has been obtained, as will be described hereinafter, during the pulsing tests when it was found that a definite persistence of the polymer presence in the boundary layer was observed up to approximately 15 seconds after the injection was stopped. It is also believed, due to polymer suppression of the small scale eddies, that the diffusion process near the boundary is inhibited and, therefore, the spread of the polymer is reduced.

It is believed that the effect of the polymer injected through the 5° slot is concentrated in the lower part of the boundary layer. Hence, an almost tangential injection of polymer will keep the polymer near the boundary where it has most of its effect and consequently, the required concentration can be achieved at a great saving of additive.

In the tests conducted using the 5° slot which has been found to provide optimum results, the injection of polymer into the boundary layer was found to change the turbulence characteristics fundamentally. The effect of the polymer on the flow in the boundary layer close to the solid surface was observed by measuring the turbulence velocity fluctuations in the direction of the flow. The injection of polymer into the water produced a dramatic change in the hot film probe's record. The most important difference which was observed was that the high frequency, small amplitude, velocity fluctuations in pure water changed to lower frequency, larger amplitude, velocity fluctuations when the polymer solution was injected. As a result of these observations, it is believed that the scale of turbulent eddies is affected by the presence of the polymer. The microscale of turbulence in the flow was, therefore, investigated.

Additional tests were performed to isolate extraneous effects on the turbulence measurement. Firstly, when water was injected under identical conditions and the hot film probe was located 1 foot downstream from the injection slot, no change in turbulence records could be observed from those obtained without injection. Hence, it is believed that the changes in the turbulence velocity fluctuations recorded when the polymer was being injected were due to the presence of the additive in the boundary layer.

Secondly, the delayed insertion of the hot film probe into the boundary layer gave records of velocity fluctuations of identical character to those obtained with the probe located at its test position from the beginning of injection. The comparison of the velocity fluctuations was made with respect to the end of the injection period. Hence, the turbulence velocity fluctuations recorded by the hot film probe show the fluctuations in the boundary layer and are not an effect on polymer globules stuck to the hot film probe itself. As a result of these two tests, it is clear that the changes in measured values of turbulence were due only to the injected polymer additive.

Tests were also conducted to determine the effect of single pulsing of varying duration of injection of polymer. After the injection was stopped, the time taken for the turbulence pattern to return to the pure water form was measured from the records. The results indicated that for the same average velocity of the main flow, the persistence of the polymer effect is practically independent of the length of the injection pulse. The persistence time remained approximately constant and was equal to about 15 seconds for the injection pulses varying from about 1 second up to about 20 seconds.

It has been found that there are many parameters which may affect the persistence time. The chief among these parameters include the type of polymer, the velocity of main flow, and the location of the measuring point in the boundary layer.

It is believed that the persistence time should decrease as the main flow velocity increases and the distance of the measuring point from the boundary layer increases. It is believed that the time should increase with higher molecular weight polymer and with higher pressure of injection, i.e. a higher rate of injection.

Measurements were also taken of microscale of turbulent eddies in the boundary layer. It was found that the polymer causes an increase in the average size of the turbulent eddies. This increase can be regarded as a shift of eddies in the spectrum of turbulence from higher to lower wave numbers moving the turbulence characteristics away from dissipative into or towards the conservative region of the spectrum. The outcome of this shift is a lower dissipation of turbulent energy of the flow, and hence a lower drag.

It is also possible to relate the size of the eddies to the thickness of the components of the boundary layer in order to consider the increase in size of the turbulent eddies due to the injection of polymer. A boundary sublayer and/or buffer zone of certain thicknesses can accommodate eddies of certain maximum size. This, in turn, will produce a less steep velocity gradient at or near the wall giving a reduced shear stress at the wall. While the thickness of the viscous sub-layer increases with the presence of polymer, the overall thickness of the boundary layer decreases. The combined effect of the reduction of shear stress at the wall and smaller energy content of the thinner boundary layer results in a lower frictional resistance.

The repeated pulsing of injection showed that by a suitable choice of duration of pulses followed by pauses of certain lengths of time, similar effects on the turbulence characteristics can be achieved as for continuous injection. Pulsing showed that an order of magnitude saving in the expenditure of additive can be achieved. Just as in single pulsing, the short duration repeated pulsing proved to be most efficient. Efficiency was defined as the length of time of changed turbulence characteristics divided by the total time of record. In one example, four 1-second injection pulses separated by 15-second pauses gave a time of change characteristics of 52 seconds, the time for the total pulses being 64 seconds, resulting in an efficiency of 0.81. Consequently, the unexpected advantages in economy of polymer expenditure through the use of the repeated pulsing of injection is evident.

Tests were also conducted to show the efficiency of pulsed injections for various lengths of pauses and for injection pulses of 0.5, 1, 2 and 3 seconds. It was found that the optimum results are obtained when the duration of the pulses is 1 second and the pauses are between 10 and 13 seconds. It was found that a 0.5 second pulse results in inefficient polymer utilization.

It is believed that the 1 second pulsing time injection is most effective because of previously mentioned surface effects. When the injection starts, the polymer adsorbs onto the surface of the boundary and if a sufficient amount is released, it will completely saturate the surface. Any additional polymer will be swept downstream by the flow at the speed of the successive layers of the flow and will not, therefore, have much effect on the persistence or on the turbulence characteristics. After the injection has been stopped, the adsorbed polymer molecules will be washed downstream by the flow, resulting in a gradual return to water-alone turbulence characteristics.

Measurements of changes of microscale of turbulence with the distance perpendicular to the boundary 1 foot downstream from the ejection slot and also along the channel at 0.1 inch above the boundary were measured. The size of the turbulence eddies were found to be doubled at a distance of 0.025 inch away from the boundary layer after polymer was injected but was found to remain unaffected above 0.6 inch. It is believed that this defines the effective extent of dispersion of polymer in the boundary layer under these test conditions. In the downstream direction, the eddy scale increased 1.84 times its size in water alone at 0.7 inch away from the injection slot and 1.55 times its size in water 36 inches from the slot. This relatively small change indicates that the polymer is retained in the boundary layer for substantial distances along the direction of flow.

The dispersion of the additive downstream from injection slot necessitates a number of injection positions spaced along the surface for optimum drag reduction. The almost tangential injection through 5° slots permits wider spacing between the slots and thus produces a greater economy in the expenditure of the polymer.

On the basis of the above results the savings in the required amount of additive for large ships, submarines and torpedoes can be summarized as follows:

Firstly, due to injection pulsing—tenfold; and secondly, due to tangential injection and due to "surface effect" which keeps polymer in and near the viscous sublayer (requiring much less additive for the necessary concentration)—tenfold.

Therefore, it is believed that a total probable saving of polymer may be of the order of 100 times. This would reduce the required 19,500 pounds of Polyox FRA additive to a more reasonable 195 pounds per hour for a typical submarine.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A process for reducing the drag between a liquid and a solid body where there is relative movement between the liquid and the solid body, the process comprising periodically injecting a dilute solution of a high molecular weight polymer nearly tangentially into the boundary layer between the liquid and the solid body.

2. The process of claim 1, wherein the periodic injection is for a time $(t)$ seconds of injection followed by $(n)(t)$ seconds of pause, where $t$ is 1 to 5 seconds and $n$ is 5 to 20.

3. The process of claim 2, wherein the dilute solution contains 0.1–2% by weight of the high molecular weight polymer.

4. The process of claim 3, wherein the polymer is a polyethylene oxide.

5. The process of claim 3, wherein the polymer is $\beta$-1, 4-glycosidic mannose with branched $\alpha$-1,6-glycosidic linkage.

6. The process of claim 3, wherein the polymer is an ethylene oxide adduct on p-nonylphenol.

7. The process of claim 3, wherein the polymer is a polyethylene oxide and wherein the concentration in the fluid is 1–200 parts per million by weight.

8. The process of claim 3, wherein the polymer is $\beta$-1, 4-glycosidic mannose with branched $\alpha$-1,6-glycosidic linkage and wherein the concentration in the fluid is 20–1000 parts per million by weight.

9. A structure for reducing the drag between a liquid and a solid body, where there is relative movement between the liquid and the solid body, the structure comprising:
   a solid having a first surface and a second surface;
   at least one row of channels extending along said first surface, each of said rows of channels including a plurality of channel-like slots, each channel slot extending from said first surface to said second surface, at an angle between about 1° and 8° to the plane of said first surface;
   inlet means from said second surface to each of said slots; and
   means connected to said inlet means for periodically injecting a liquid into each of said slots, for subsequent periodic ejection from each of said slots.

10. A structure as claimed in claim 9 comprising a plurality of longitudinally spaced apart rows, each including a plurality of slots disposed on the outer hull of a waterborne vessel.

11. The structure of claim 10 wherein the channel-like slots extend at an angle of about 5° to the plane of said first surface.

12. A structure as claimed in claim 10 wherein said plurality of longitudinally spaced apart rows each including a plurality of slots are disposed in rings encircling the body of said waterborne vessel.

13. A structure as claimed in claim 11 wherein said plurality of longitudinally spaced apart rows each including a plurality of slots are disposed in rings encircling the body of said waterborne vessel.

References Cited

UNITED STATES PATENTS

| | | | |
|---|---|---|---|
| 2,954,750 | 10/1960 | Crump et al. | 114—67 XR |
| 3,230,919 | 1/1966 | Crawford | 114—67 |

ANDREW H. FARRELL, Primary Examiner

UNITED STATES PATENT OFFICE
CERTIFICATE OF CORRECTION

Patent No. 3,516,376          Dated June 23, 1970

Inventor(s) Tadeusz Kowalski

It is certified that error appears in the above-identified patent and that said Letters Patent are hereby corrected as shown below:

In the heading to the printed specification, after line 6, insert -- Claims priority, application Canada August 31, 1967 999,146 --.

Signed and sealed this 15th day of June 1971.

(SEAL)
Attest:

EDWARD M. FLETCHER, JR.
Attesting Officer

WILLIAM E. SCHUYLER, JR.
Commissioner of Patents